June 30, 1931.  G. W. THURMOND, SR  1,812,574
WHEELED DEVICE FOR LAYING OFF LAND
Filed Aug. 5, 1926
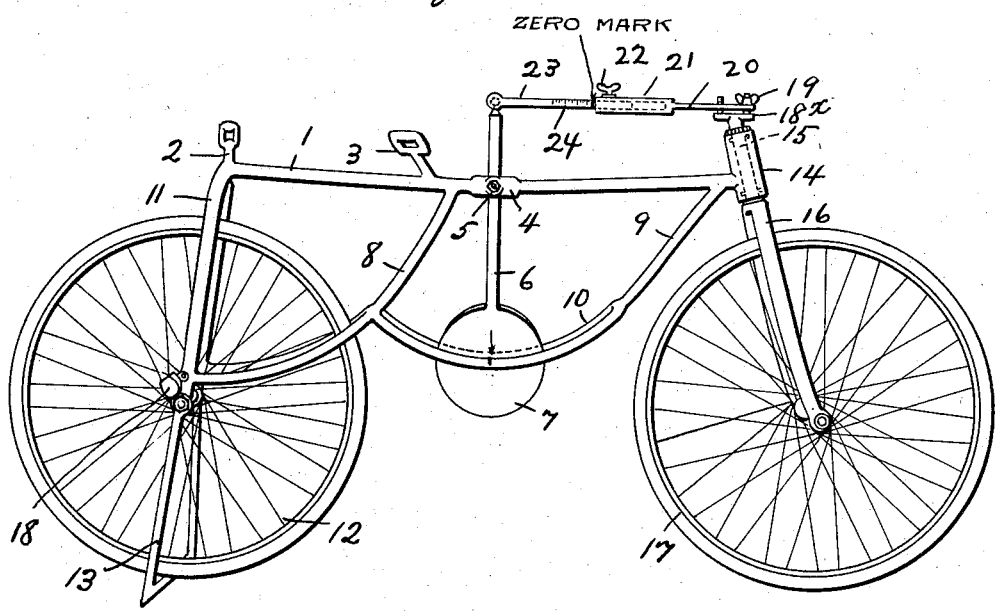
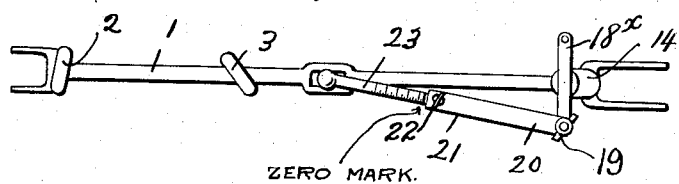
Inventor
George Washington Thurmond, Sr.
By Clarence A. O'Brien
Attorney Patented June 30, 1931

1,812,574

UNITED STATES PATENT OFFICE

GEORGE WASHINGTON THURMOND, SR., OF WARRENVILLE, SOUTH CAROLINA

WHEELED DEVICE FOR LAYING OFF LAND

Application filed August 5, 1926. Serial No. 127,427.

My present invention has to do with the laying off of a track upon land so that the same will be level or have a certain predetermined inclination; and it has for its general object the provision of a wheeled device through the medium of wihch land may be expeditiously and easily laid off.

Other objects and practical advantages of the invention will be fully understood from the following description and claims when the same are read in connection with the drawings, accompanying and forming part of this specification, in which:

Figure 1 is perspective of the wheeled device constituting the best practical embodiment of my invention of which I am aware.

Figure 2 is a fragmentary top plan view showing a portion of the device hereinafter explicity referred to.

Similar numerals of reference designate corresponding parts in all of the views of the drawings.

Among other elements, my novel device comprises a main frame 1 which with the exceptions hereinafter pointed out is similar to an ordinary bicycle frame. The said frame 1 is peculiar in that it is provided on its longitudinal top bar with handles 2 and 3 spaced apart and arranged as clearly shown in Figures 1 and 2. The handle 2 is for the left hand of the user of the device, and the handle 3 is for the right hand of such user, and in this connection it will be understood that it is the province of the user of the device to move the same longitudinally along the land to be laid off. The top bar of the frame 1 is also peculiar in that it is provided at an intermediate point in its length and in front of the foremost handle 3 with a slotted portion 4 in which is pivoted at 5 a lever 6, said lever 6 extending above and below the top bar of the frame 1 and being provided at its lower end with a disk-like weight 7. As will be readily understood from Figure 1 the frame 1 is further peculiar in that it is provided between a rear brace bar 8 and the forward end of the top bar with a brace and weight guide 9, the said brace and weight guide 9 being longitudinally slotted at 10 for the reception and play of the weight disk 7. At its rear end the frame 1 is provided with a fork 11 and in said fork 11 is mounted a conventional bicycle wheel 12. It will also be understood that a stand 13 is connected in the ordinary well known manner with the fork 11, so that when at rest the device may be maintained in an upright position. Of course when the device is to be put into use, the stand 13 is raised and is maintained in raised and idle position in the ordinary well known manner. The frame 1 is further provided at its forward end with a sleeve 14 in which is journaled in conventional or any other approved manner the stem 15 of the front fork 16 of the device, the said front fork 16 carrying a conventional bicycle wheel 17.

At 18 is a distance register geared to the rear wheel 12 and clamped or otherwise appropriately connected to the fork 11 of the frame 1.

The beforementioned stem 15 of the front fork 16 is journaled to turn about its axis in the sleeve 14, and manifestly the ordinary ball bearing or any other approved means will be resorted to in order to insure free and easy turning of the stem 15 in the sleeve 14.

At its upper end, the stem 15 is equipped with a lever 18x, and connected at 19 to the said lever is a rod 20 having a sleeve portion 21, equipped with a set screw 22. Pivotally connected to the upper end of the lever 6 and extending forwardly therefrom and telescopically arranged in the sleeve portion 21 of the rod 20 is a rod 23 which is calibrated or provided with graduations as designated by 24, and is designed to be adjustably fixed by the set screw 22 in the sleeve 21.

The practical use and advantages of my novel device will be understood from the following:—

Where terraces are to be laid off on a hill side, the first thing to do if the terrace is to be laid off on a perfect level is to see that the end of the sleeve portion 21 is at zero on the calibrated rod 24, but if the terraces are to be laid off with a slight fall so as to drain the water to one end, the end of the sleeve portion 21 must be placed at a point in front of the zero or the center mark on the calibrated rod 24. The distance the end of the sleeve portion 23 should be placed from center mark depends on the amount of fall desired. After the proper adjustments have been made on the rod 23 and the sleeve coupling is adjustably fixed by the set screw 22 to the rod 23, the rear wheel 12 should be placed at a point where the end of the terrace is to be, with the front wheel 17 disposed in the direction in which the terrace is to be laid. Let it be assumed that the terrace is to be laid off at a perfect level, that consequently the sleeve portion 21 has been secured in register with the zero or center mark of the rod 24, and that both wheels are resting on the ground, then, if the front wheel be lower than the rear wheel, the front portion of the device should be elevated by hand, and the front wheel should then be moved to the right or to the left until it rests on the ground at a place level with that on which the rear wheel rests. When the device becomes level the pointer on the weight 7 will be directly over the center mark on the guide 9, and both wheels will be in the same plane. After the device has been placed in a level position, the device is moved forwardly, and after said movement for a few paces, the operator is enabled to determine whether or not the control rod 23 is connected with the proper end of the lever 18x. The foregoing will be understood when it is stated that in cases where the land is to be layed off on a perfect level or near level the terrace will be parallel with the hillside. If the land to be layed off is inclined upwardly toward the north and downwardly toward the south and if the terrace is to be level or nearly level one end will be toward the east and the other toward the west, and if the apparatus is started at the eastern end the downward incline will be toward the right of the device and the control rod will be connected to the right hand end of the element 18x, but if in this case the operator is to start laying off at the western end, the device is moved toward the east and the upward incline will be to the west, the control rod being connected to the left hand end of the element 18x. In other words, the operator is enabled to determine whether or not the described connection between the lever 18x and the upper end of the lever 6 is the correct one to suit the land which is to be laid off, according to whether the land is inclined upwardly toward the right hand side or the left hand side of the device. If the said connection is the proper one, the lever 6 will continue to stand as stated, but if the connection is to the wrong end of the lever 18x to suit the land, the device, after being moved a few paces will get off of a level, as will be indicated by the weight 7 standing to one side of the mark or guide 9. After the condition indicated is ascertained by the operator, the operator should wheel the device in a backward direction a few paces until the device is back at the starting point. The rod 23 or rather the connection including the rod 23 should be shifted to the other end of the lever 18x and the device will be set right to lay off that particular terrace. If the land in front of the device inclines upwardly, while the control rod 23 is connected as shown in Figure 2 to the end of the lever 18x on the right hand side of the device, the weight 7 will cause the device to turn toward the left, and if the land toward the left inclines downwardly, the device will change its course to a slight extent, whereas if the land toward the left should incline upwardly instead of downwardly, the device will continue to turn toward the left as long as the land inclines upwardly in front of the device. If the line is to incline upwardly in front of the device, it will be necessary to adjust the rod 23 forwardly in the sleeve 21, but if the line is to incline downwardly in front of the device, the rod 23 should be moved outwardly from the sleeve 21. When the end of the sleeve 21 is at the central mark of the calibrations and the weight 6 is perpendicular, both wheels of the device will be in the same plane, provided the device is standing on a level, but if one wheel is lower than the other, the weight will cause the front wheel to turn to one side. To lay off the level lines, on land that is not level, the line must necessarily be crosswise to the incline. For instance, if the land is to be laid off, and it inclines upward toward the north and downward toward the south, or upward toward the south and downward toward the north, to get a level line, the line will have to be laid off from east to west or from west to east. In every case, the land to be laid off inclines upwardly to one side of the bicycle or device and downward to the other side thereof. In this connection it will be understood that in the illustration in Figure 1 of the drawings, the calibrations at the right hand side of the central mark of the calibrations are in the sleeve 21. Also, the calibrations shown on the rod 23 are at the left hand side of the central or zero mark.

The rear wheel of the device is never placed at a point lower or higher than it should be for starting, for in every case no matter whether the terrace is to be laid off with a slight fall or incline or not, the rear wheel of the device is placed exactly at the point from which the terrace is to be started. After the operator locates the point at which he wishes to start laying off he places the rear wheel of the device there, with the front wheel in the direction the terrace is to be laid off, and if the front wheel is lower or higher than it should be, it will be slightly turned to one side and the weight will hang off the center, and while the rear wheel remains on the ground, the operator lifts the front wheel by hand and moves it to the right or left. The direction in which it should be moved depends on whether it is too high or too low. If the land inclines upward toward the right and downward to the left, and if the front wheel is too low it should be moved to the right until it is level with and in the same plane as the rear wheel, but if the front wheel is too high and the land inclines downward toward the left, the front wheel should be moved toward the left until it becomes straight with the rear wheel and the weight hangs centrally over the center mark. If the terrace is to be laid off on a perfect level not having any fall or incline and in cases where the terrace is to be laid off with a slight fall or incline so as to drain water to one end, the device is positioned in the same manner as for a terrace not having any fall or incline.

The foregoing will be understood when it is said that to place the device in position for laying off a terrace with a slight fall or incline the operation is the same as for placing the device to lay off on a perfect level except the sleeve coupling on the control rod will not register at zero on the calibrated portion of said rod but will register at a point to one side of zero. The side at which it will register will depend on whether the incline is upward or downward to the front of the device. If the incline is to be downward to the front of the device the adjustable control rod must be made longer by loosening the thumb screw on the sleeve coupling and drawing out the inserted portion of the rod until the end of the sleeve portion registers at a point indicating the amount of fall or incline desired. When the end of the sleeve coupling is placed at the calibration showing the desired fall it is secured in place by tightening the thumb screw. The calibrations on the control rod are to be made so that any amount or fall or rise within certain limits can be determined by them. The adjustable control rod must be made longer than the incline is downward to the front, and the front wheel of the device must be in a lower plane or at a point lower than the rear wheel if the land to be layed off inclines upward to the right of the device. The front wheel is to be made lower by moving it toward the left and when it is at a point as low as it should be, it will not be turned to either side but will stand straight with the rear wheels and the frame of the device; and on the other hand, if the terrace is to incline upward to the front of the device, the adjustable control rod must be made shorter by loosening the thumb screw on sleeve portion 21 and inserting the calibrated portion of the rod until the end of the sleeve portion is at a point indicating the desired rise, and the front wheel of the device in this case must be placed in a higher plane or at a point higher than the rear wheel after the proper adjustments have been made on the control rod and the rear wheel is placed at starting point. The front wheel is lifted by hand and moved from right to left or from left to right until it is placed at a point where it will not be turned to either side but will stand straight in line with the rear wheel. When the device is placed at the starting point and the front wheel is too high or too low to suit the adjustments on the control rod which have been made to lay off either level or with an incline upward or downward, the weighted lever will cause the wheel to turn cross ways to the frame of the device, but when it is moved to one side and placed at a point as high or low as it should be, the weight will cause it to become straight with the frame of the device. In both cases the front wheel must be moved until it stands straight with the rear wheel. As long as the front wheel is too high or too low, the weight will cause it to be turned to the right or to the left. Of course when the terrace is to be laid off with an incline and the wheels are in place, the weight will hang off the center mark, but nevertheless the front wheel will be straight in line with the rear wheel. The weight is not supposed to hang centrally over the center mark except in cases where the terraces are to be level. The end of the sleeve is not supposed to be at the zero or center mark except in cases where the terrace is to be laid off without any incline or fall at all. Where the terrace is to be laid off with an incline so as to drain water to one end, the connection between the weighted lever and the element 18$x$ must be made longer or shorter by the necessary adjustment. The necessary adjustments are determined by the calibrations on the adjustable control rod. The said calibrations are to be made so as to indicate any rise or fall desired within certain limits. If the terrace is to incline downwardly to the front of the device, the said connection must be made longer, but if the terrace is to be inclined upwardly in front of the device the connection referred to must be made shorter. When the land inclines upwardly toward the right of the device, the connection referred to must be connected to the right hand end of the element 18$x$, but if the land inclines upward at the left of the device, the said connection must be connected to the left hand end of the element 18$x$. Where more than one terrace is to be laid off on a hill side, the connection referred to must be shifted from one end of the element 18$x$ to the other for every alternate terrace, this because if the land inclines upward toward the right when laying off the first terrace the incline will be toward the left on the second terrace, since the second terrace will be laid off on the return trip.

The expression in the foregoing which reads "straight with the rear wheel" will be fully understood when it is stated that the front wheel of the device is carried by a fork that works in a sleeve so that said front wheel may be turned to the right or left like the front wheel of a bicycle. When the proper adjustment has been made on the adjustable control rod between the element 18x and the weighted lever the device is placed on the starting point, and when the device is so positioned the front wheel will not stand at an angle to the rear wheel but will be straight with the frame of the device.

I have entered into a detailed description of the construction and relative arrangement of the parts of the present and preferred embodiment of my invention in order to impart a full, clear, and exact understanding of the preferred embodiment. I do not desire however to be understood as limiting myself to the precise structure disclosed, my invention being defined by my appended claims within the scope of which structural departures may be made without departure from my invention.

Having thus described the invention, what I claim as new and desire to secure by Letters Patents is:—

1. A device for use in laying off land, comprising a main frame, a wheel mounted in the rear portion of said frame, handles on the upper rear portion of the frame, a lever fulcrumed at an intermediate point in its length to the frame, and having a weight on its lower arm, a wheel carrier journaled in the forward portion of the frame and having a lever at its upper end, a wheel carried by said carrier, a rod pivotally connected to said lever and having a sleeve portion equipped with a set screw, a calibrated rod pivotally connected to the upper arm of the weighted lever and telescopically arranged in said sleeve and adapted to be detachably engaged by said set screw, and means carried by the frame and arranged to receive and guide the said weight.

2. A device for use in laying off land, comprising a main frame, a wheel mounted in the rear portion of said frame, handles on the upper rear portion of the frame, a lever fulcrumed at an intermediate point in its length to the frame, and having a weight on its lower arm, a wheel carrier journaled in the forward portion of the frame and having a lever at its upper end, a wheel carried by said carrier, a rod pivotally connected to said lever and having a sleeve portion equipped with a set screw, a calibrated rod pivotally connected to the upper arm of the weighted lever and telescopically arranged in said sleeve, and adapted to be detachably engaged by said set screw, and means carried by the frame and arranged to receive and guide the said weight; the said rear or first named wheel being geared to a distance register carried by the frame.

In testimony whereof I affix my signature.

GEORGE W. THURMOND, Sr.